United States Patent
Um et al.

(10) Patent No.: US 8,964,886 B2
(45) Date of Patent: Feb. 24, 2015

(54) METHOD AND DEVICE FOR TRANSMITTING A PREAMBLE IN A WIRELESS COMMUNICATION SYSTEM

(75) Inventors: Jung Sun Um, Daejeon-si (KR); Sung Hyun Hwang, Daejeon-si (KR); Sang Won Kim, Daejeon-si (KR); Byung Jang Jeong, Daejeon-si (KR); Chang Joo Kim, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

(21) Appl. No.: 13/877,996

(22) PCT Filed: Feb. 9, 2011

(86) PCT No.: PCT/KR2011/000863
§ 371 (c)(1),
(2), (4) Date: Apr. 5, 2013

(87) PCT Pub. No.: WO2012/077859
PCT Pub. Date: Jun. 14, 2012

(65) Prior Publication Data
US 2013/0315342 A1     Nov. 28, 2013

(30) Foreign Application Priority Data
Dec. 7, 2010   (KR) ........................ 10-2010-0124032

(51) Int. Cl.
*H04L 27/00* (2006.01)
*H04L 27/26* (2006.01)
(Continued)

(52) U.S. Cl.
CPC ........ *H04L 27/2602* (2013.01); *H04L 27/2613* (2013.01); *H04L 27/2675* (2013.01);
(Continued)

(58) Field of Classification Search
CPC ............ H04L 27/2613; H04L 27/2675; H04L 27/2602
USPC ......... 375/295, 135, 136, 219, 279, 395, 340; 327/291; 332/106, 112, 114; 341/20, 341/173, 177; 370/469
See application file for complete search history.

(56) References Cited

U.S. PATENT DOCUMENTS 7,385,929 B1 *   6/2008   McFarland et al. ........... 370/243
8,223,893 B1 *   7/2012   Narasimhan ................. 375/340
(Continued)

FOREIGN PATENT DOCUMENTS

| KR | 10-2006-0070949 | 6/2006 |
| KR | 10-2006-0082744 | 7/2006 |
| KR | 10-2007-0061208 | 6/2007 |

OTHER PUBLICATIONS

Standard ECMA-368 "High Rate Ultra Wideband PHY and MAC Standard" 3rd Edition / Dec. 2008.*
(Continued)

*Primary Examiner* — Daniel Washburn
*Assistant Examiner* — Amneet Singh
(74) *Attorney, Agent, or Firm* — NSIP Law

(57) ABSTRACT

A wireless communication system provides a method and device for transmitting a preamble. A transmitter generates a first preamble sequence used for frequency offset estimation and generates a second preamble sequence according to the transmission mode. The transmitter transmits the first and second preamble sequences. With respect to the second preamble sequence, the phase thereof may be shifted into different phase offsets according to the transmission mode.

7 Claims, 17 Drawing Sheets

(51) Int. Cl.
*H04L 5/00* (2006.01)
*H04L 25/02* (2006.01)

(52) U.S. Cl.
CPC .......... *H04L27/2694* (2013.01); *H04L 5/0048* (2013.01); *H04L 27/2659* (2013.01); *H04L 27/266* (2013.01); *H04L 27/2662* (2013.01); *H04L 5/0023* (2013.01); *H04L 27/0006* (2013.01); *H04L 25/0232* (2013.01)
USPC .......................................... 375/295; 375/340

(56) References Cited

U.S. PATENT DOCUMENTS

| | | | |
|---|---|---|---|
| 2005/0249244 A1* | 11/2005 | McNamara et al. | 370/474 |
| 2006/0062317 A1* | 3/2006 | Chang et al. | 375/260 |
| 2006/0140293 A1* | 6/2006 | Lai et al. | 375/260 |
| 2007/0014271 A1* | 1/2007 | Lai | 370/342 |
| 2007/0104089 A1* | 5/2007 | Mujtaba | 370/209 |
| 2009/0290654 A1* | 11/2009 | Yu et al. | 375/267 |
| 2009/0310524 A1* | 12/2009 | Katsube et al. | 370/311 |
| 2010/0061402 A1* | 3/2010 | van Zelst et al. | 370/474 |
| 2010/0086013 A1* | 4/2010 | Pare et al. | 375/219 |
| 2010/0315952 A1* | 12/2010 | Pare et al. | 370/241 |
| 2010/0315953 A1* | 12/2010 | Pare et al. | 370/241 |
| 2011/0013729 A1* | 1/2011 | Yuba et al. | 375/329 |
| 2011/0051705 A1* | 3/2011 | Jones et al. | 370/338 |
| 2012/0014336 A1* | 1/2012 | Seok | 370/329 |
| 2012/0039315 A1* | 2/2012 | Pare et al. | 370/338 |
| 2012/0039321 A1* | 2/2012 | Ghosh et al. | 370/338 |

OTHER PUBLICATIONS

International Search Report from Corresponding PCT Application, PCT/KR2011/000863, dated Nov. 23, 2011.

* cited by examiner

METHOD AND DEVICE FOR TRANSMITTING A PREAMBLE IN A WIRELESS COMMUNICATION SYSTEM

CROSS-REFERENCE TO RELATED APPLICATIONS

This application is a U.S. national stage application of International Application No. PCT/KR2011/000863 filed on Feb. 9, 2011, and claims the benefit of Korean Application No. 10-2010-0124032 filed on Dec. 7, 2010.

TECHNICAL FIELD

The present invention relates to wireless communications, and more particularly, to a method and apparatus for transmitting a preamble in a wireless communication system, and a receiver using the same.

BACKGROUND ART

European computer manufacturers association (ECMA)-392 standard ("medium access control (MAC) and physical (PHY) for operation in TV white space," $1^{st}$ edition, December 2009) is the specification for a personal/portable cognitive radio (CR) system.

ECMA-392 standard basically operates in single-antenna transmission, and additionally supports multiple-antenna transmission.

In order to successfully receive a data packet, a receiver has to determine whether a transmitter uses the single-antenna transmission or the multiple-antenna transmission in transmitting the data packet.

An error in detecting a transmission mode may cause data loss in the receiver. Also, the kind of transmission mode becomes various with introduction of new technologies.

Accordingly, a technique for more reliably detecting various transmission modes is needed.

DISCLOSURE

Technical Problem

The present invention provides a method and apparatus for transmitting a preamble for detecting a transmission mode, and a receiver using the same.

Technical Solution

In an aspect, a method for transmitting a preamble in a wireless communication system is provided. The method includes generating a first preamble sequence used for frequency offset estimation, generating a second preamble sequence in accordance with a transmission mode, transmitting the first preamble sequence, and transmitting the second preamble sequence.

A phase of the second preamble sequence may be shifted by a phase offset different depending on the transmission mode.

The phase of the second preamble sequence may be shifted in frequency domain or time domain.

The first preamble sequence may be transmitted in one orthogonal frequency division multiplexing (OFDM) symbol, and the second preamble sequence may be transmitted in a plurality of OFDM symbols subsequent to the OFDM symbol in which the first preamble sequence is transmitted.

The phase of the second preamble sequence transmitted in at least one OFDM symbol among the plurality of OFDM symbols may be shifted.

The second preamble sequence may be generated for each antenna, and the second preamble sequence for each antenna may be transmitted as being allocated to subcarriers respectively different for each of the plurality of OFDM symbols.

The first and second preamble sequences may be included in a physical layer convergence protocol (PLCP) preamble of a physical layer protocol data unit (PPDU) frame format.

The transmission mode may include a single antenna transmission mode, a multiple antenna transmission mode, and a multi-channel transmission mode.

In another aspect, a transmitter includes a processor configured to generate a first preamble sequence used for frequency offset estimation and generate a second preamble sequence in accordance with a transmission mode, and a transmitting unit configured to transmit the first and second preamble sequences through a wireless channel.

of claim 10, wherein the processor is configured to shift the phase of the second preamble sequence in frequency domain or time domain.

In still another aspect, a receiver includes a receiving unit configured to receive first and second preamble sequences from a transmitter through a wireless channel, and a processor configured to detect a frequency offset based on the first preamble sequence and determine a transmission mode used by the transmitter based on the second preamble sequence.

In still another aspect, a method of detecting a transmission mode in a wireless communication system is provided. The method includes receiving first and second preamble sequences from a transmitter through a wireless channel, detecting a frequency offset based on the first preamble sequence, and determining a transmission mode used by the transmitter based on the second preamble sequence.

Advantageous Effects

By using a preamble, it is possible to detect more various kinds of transmission mode. Channel estimation over subcarriers is possible for each antenna, so that performance of the channel estimation can be improved.

MODE FOR INVENTION

Figure 1:
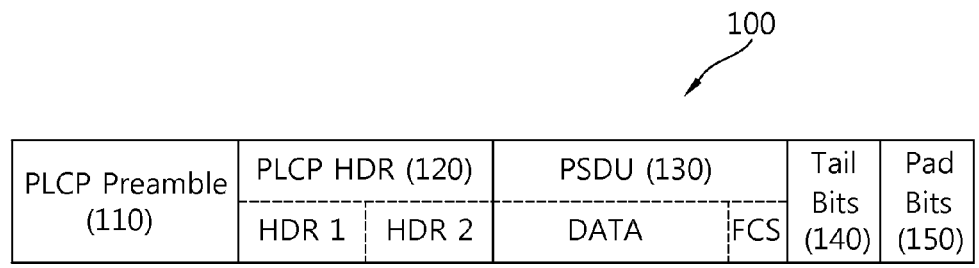
FIG. 1 shows a PPDU frame format based on standard ECMA-392.

FIG. 1 shows a physical layer protocol data unit (PPDU) frame format based on standard ECMA-392. The PPDU is a data block configured in a physical layer.

The PPDU 100 includes a physical layer convergence protocol (PLCP) preamble 110, a PLCP header (HDR) 120, a physical layer service data unit (PSDU) 130, tail bits 140, and pad bits 150.

The PLCP header 120 includes a physical (PHY) header, a medium access control (MAC) header, tail bits, and parity bits. The PHY header includes a data rate, a PLCP length, a transmission mode, a scrambler initialization seed, an interleaver option, a multiple antenna field, a cyclic prefix (CP) mode, and a transmission power field.

The multiple antenna field in the PHY header is a 2-bit field, which is used in determining a type of multiple antenna transmission scheme as shown in the following table 1.

TABLE 1

| Bits | Multiple antenna transmission scheme |
|---|---|
| (00) | Reserved |
| (01) | Frequency interleaved transmit diversity (FITD) |
| (10) | Space time block code (STBC) |
| (11) | Spatial multiplexing (SM) |

If a transmitter uses only a single antenna, the bits of the multiple antenna field are set with "00". A comprehensive example of the multiple antenna transmission scheme may be referred to sections 9.11.4 to 9.11.6.

The PSDU 130 is a packet data block of an upper layer transmitted through the PPDU 110.

The PLCP preamble 110 is used for frequency and time synchronization and channel estimation by a receiver.

Two types of PLCP preamble 110 are defined. One is a normal PLCP preamble, and the other is a burst PLCP preamble. The normal PLCP preamble is used for all packets in a normal mode and for the first packet in a streaming mode. The burst PLCP preamble is used for the second and subsequent packets in the streaming mode.

Figure 2:
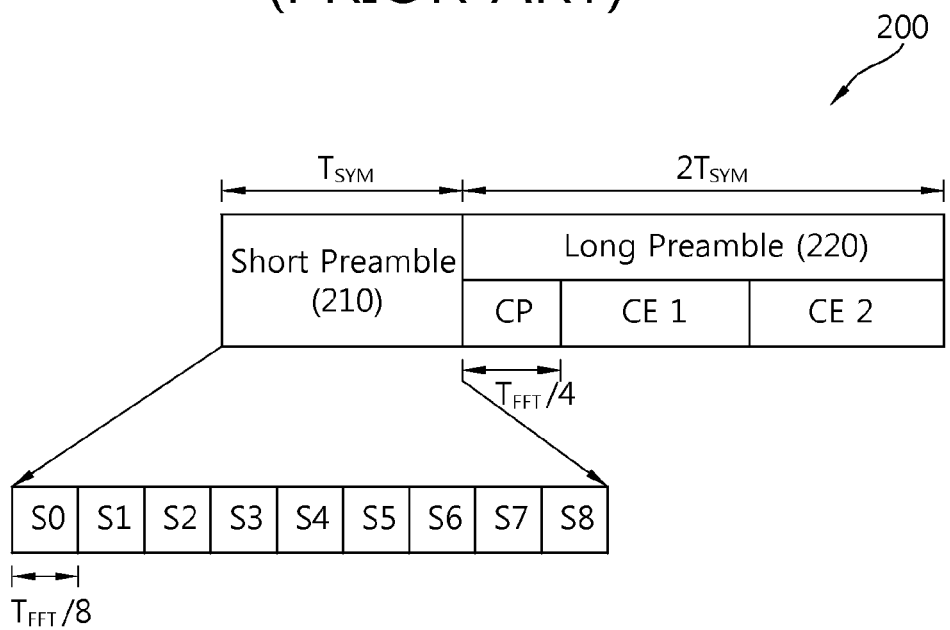
FIG. 2 shows a format of a normal PLCP preamble.

FIG. 2 shows a format of the normal PLCP preamble.

The normal PLCP preamble 200 has the length of three orthogonal frequency division multiplexing (OFDM) symbols, and includes a short preamble 210 and a long preamble 220.

The short preamble 210 (or referred to as a first preamble) is used for initial burst detection. The initial burst detection includes automatic gain control (AGC) tuning, coarse frequency offset estimation and timing synchronization.

The long preamble 220 (or referred to as a second preamble) is used in channel estimation and fine frequency offset estimation.

The short preamble 210 is configured with nine-times repetition of a first training sequence. The long preamble 220 is configured with two-times repetition of a second training sequence.

The preamble sequence for the short preamble 210 is generated as follows.

A frequency domain sequence having a length of 128 is defined as shown in the following equation.

$$PST(-64:63) = \sqrt{\frac{102}{12}} \begin{Bmatrix} 0,0,0,0,0,0,0,0,0,0,0,0,0,0,0,0,1, \\ 0,0,0,0,0,0,0,0,1, \\ 0,0,0,0,0,0,0,1, \\ 0,0,0,0,0,0,0,-1, \\ 0,0,0,0,0,0,0,-1, \\ 0,0,0,0,0,0,0,-1, \\ 0,0,0,0,0,0,0,0,0,0,0,0,0,0,0,-1, \\ 0,0,0,0,0,0,0,-1, \\ 0,0,0,0,0,0,0,-1, \\ 0,0,0,0,0,0,0,-1, \\ 0,0,0,0,0,0,0,1, \\ 0,0,0,0,0,0,0,-1, \\ 0,0,0,0,0,0,0,0,0,0,0,0,0,0 \end{Bmatrix} \quad \text{[Equation 1]}$$

The above sequence undergoes inverse fast Fourier transformation (IFFT), and it is repeated eight times, thereby generating sequences S1~S8. S0 corresponds to a cyclic prefix (CP). Each of S0~S8 corresponds to a first training sequence as a time domain sequence.

The preamble sequence for the long preamble 220 is generated as follows. A frequency domain sequence having a length of 128 is defined in the following equation.

$$PLT(-64:63) = \{0,0,0,0,0,0,0,0,0,0,0,0,0,0,-1,1,\\ 1,-1,-1,1,-1,-1,-1,-1,-1,-1,1,1,-1,-1,-1,\\ 1,1,1,1,1,-1,1,-1,-1,1,1,-1,1,-1,-1,-1,\\ 1,-1,1,1,1,1,-1,1,1,-1,1,1,1,-1,1,1,1,\\ 1,0,1,1,-1,-1,-1,-1,1,-1,1,-1,1,1,-1,\\ -1,-1,1,-1,-1,1,1,1,1,-1,1,-1,1,-1,\\ -1,1,-1,-1,1,-1,1,1,1,-1,1,1,-1,-1,1,-1,\\ -1,-1,-1,-1,1,1,-1,-1,0,0,0,0,0,0,0,0,\\ 0,0,0,0\} \quad \text{[Equation 2]}$$

The above sequence undergoes IFFT, thereby generating a second training sequence as a time domain sequence. The second training sequence CE1 is transmitted in the first OFDM symbol, and a copy (CE2) of the second training sequence is transmitted in the next OFDM symbol. The CP of two OFDM symbols are combined and transmitted in an initial part of the long preamble 220. The CP of the long preamble 220 is a double of the CP of the short preamble 210.

Meanwhile, as shown in Table 1, ECMA-392 standard supports three multiple-antenna transmission schemes. Also, to ascertain whether the single-antenna transmission scheme is used or one of three multiple-antenna transmission schemes is used, the receiver performs a procedure of ascertaining a transmission mode as follows.

Figure 3:
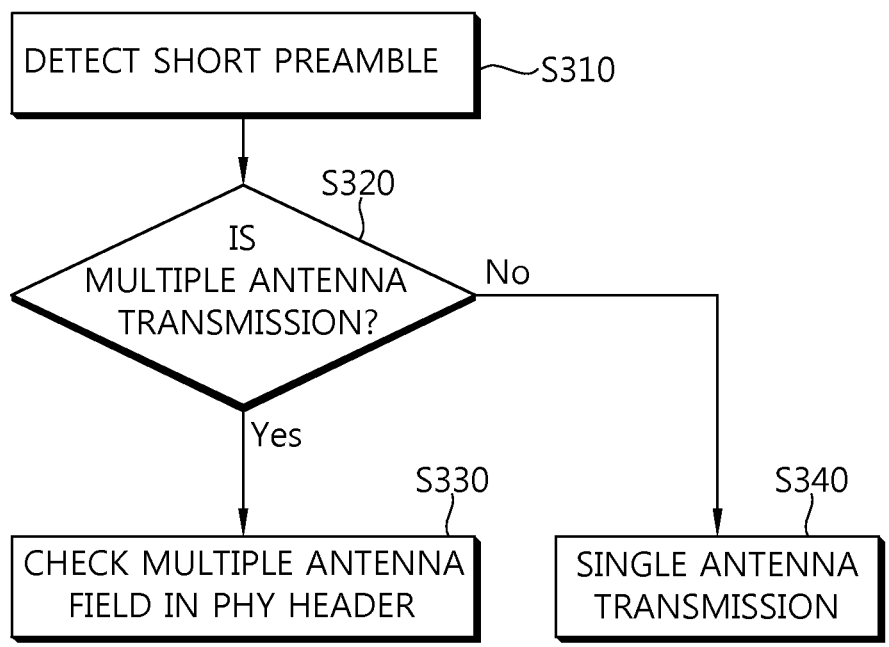
FIG. 3 shows a procedure of ascertaining a transmission mode in ECMA-392 standard.

FIG. 3 shows a procedure of ascertaining a transmission mode in ECMA-392 standard.

By detecting the short preamble, a receiver distinguishes between the single antenna transmission and the multiple antenna transmission (S310).

The single antenna transmission is used for the preamble having the short sequence of the foregoing expression 1.

The short preamble for the multiple antennas is generated as follows.

A first antenna uses the following sequence for a pilot having subcarrier indexes {−48, −32, −16, +8, +24, +40}.

$$PST2\_1(-64:63) = \sqrt{\frac{102}{12}} \begin{Bmatrix} 0,0,0,0,0,0,0,0,0,0,0,0,0,0,0,0,1, \\ 0,0,0,0,0,0,0,0,0,0,0,0,0,0,0,0,1, \\ 0,0,0,0,0,0,0,0,0,0,0,0,0,0,0,0,-1, \\ 0,0,0,0,0,0,0,0,0,0,0,0,0,0, \\ 0,0,0,0,0,0,0,0,0,0,-1, \\ 0,0,0,0,0,0,0,0,0,0,0,0,0,0,0,1, \\ 0,0,0,0,0,0,0,0,0,0,0,0,0,0,0,0,1, \\ 0,0,0,0,0,0,0,0,0,0,0, \\ 0,0,0,0,0,0,0,0,0,0,0,0,0 \end{Bmatrix}$$ [Equation 3]

A second antenna uses the following sequence for a pilot having subcarrier indexes {−40, −24, −8, +16, +32, +48}.

$$PST2\_2(-64:63) = \sqrt{\frac{102}{12}} \begin{Bmatrix} 0,0,0,0,0,0,0,0,0,0,0,0,0, \\ 0,0,0,0,0,0,0,0,0,0,0,-1, \\ 0,0,0,0,0,0,0,0,0,0,0,0,0,0,0,0,-1, \\ 0,0,0,0,0,0,0,0,0,0,0,0,0,0,0,0,1, \\ 0,0,0,0,0,0,0,0,0,0,0,0,0,0,0,0,0,0,1, \\ 0,0,0,0,-1,0,0,0,0,0,0,0,0,0,0,0,0,0, \\ 0,0,1,0,0,0,0,0,0,0,0,0,0,0,0,0,0,0, \\ 0,0,0,0,0,0,0,0,0,0,0,0,0,0,0,0 \end{Bmatrix}$$ [Equation 4]

The sequence undergoes IFFT, and it is repeated eight times, thereby generating S1~S8. S0 corresponds to the CP.

The receiver determines whether it is the multiple antenna transmission on the basis of the short preamble (S320). Taking a correlation between the foregoing sequences, it is possible to ascertain whether the transmitter uses two-antenna transmission or the single-antenna transmission.

If the short preamble for the multiple antenna transmission is detected, the receiver determines the multiple antenna field in the PHY header and determines the multiple antenna transmission scheme (S330).

If the short preamble for the single antenna transmission is detected, the receiver decodes the PSDU based on the single antenna transmission (S340).

As described above, ECMA-392 standard makes the receiver determine the transmission mode based on the received short preamble.

However, a cross correlation in a time domain is needed to detect the short preamble, in which detection performance may be deteriorated by AGC, a frequency offset, or etc.

Also, as transmission modes such as a multi-channel or the like are introduced, it is difficult for the existing schemes to detect various transmission modes.

Hereinafter, the transmission mode refers to a transmission scheme used by the transmitter to transmit a packet, which includes at least one of a single antenna transmission mode (also referred to as a single input single output (SISO) mode), a single channel transmission mode (also referred to as an SCH mode), a multiple antenna transmission mode (also referred to as a multiple input multiple output (MIMO) mode), and a multi-channel transmission mode (also referred to as an MCH mode).

The multiple antenna transmission mode may include well-known various MIMO schemes such as transmit diversity, space-time block coding (STBC), spatial multiplexing (SM), etc.

The MCH mode refers to that at least one resource of a time resource, a frequency resource and a code resource is allocated additionally as compared with the SCH mode. For example, if a bandwidth of 5 MHz is regarded as one channel, the MCH mode refers to that a packet is transmitted using two or more channels. Also, if one timeslot is regarded as one channel, the MCH mode refers to that a packet is transmitted using two or more timeslots.

Figure 4:
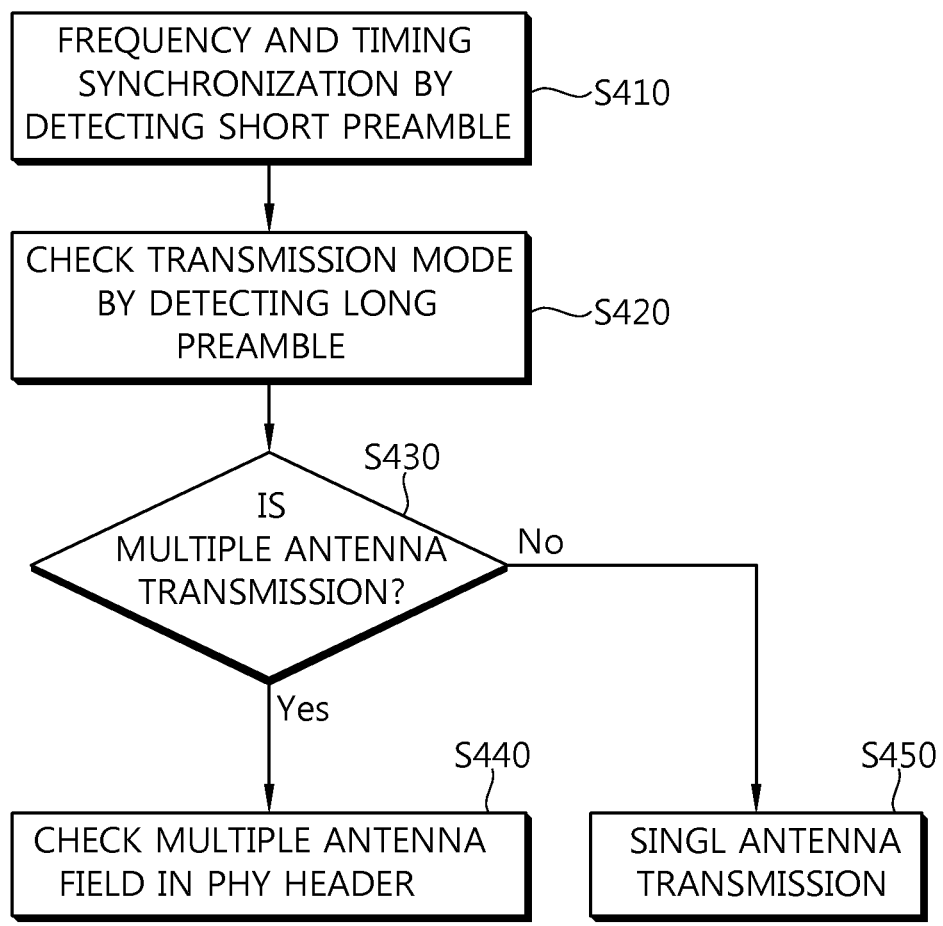
FIG. 4 shows a transmission mode detecting method according to an exemplary embodiment of the present invention.

Below, only three transmission modes, i.e., the SISO mode, the MIMO mode and the MCH mode are considered, but the technical concept of the present invention is not limited to the type or number of transmission mode FIG. 4 shows a transmission mode detecting method according to an exemplary embodiment of the present invention.

A receiver detects the short preamble to estimate a frequency offset, and performs timing synchronization (S410).

The receiver detects the long preamble to determine the transmission mode (S420). The respective transmission modes may use different long preambles, or use the sequences to be described later. The receiver takes the correlation between the sequences, and determines at least one of the SISO mode, the MIMO mode and the MCH mode.

In the case of the MIMO mode (S430), the receiver checks the multiple antenna field in the PHY header, and determines the multiple antenna transmission scheme (S440).

In the case of the SISO mode (S430), the receiver decodes the PSDU based on the single antenna transmission (S450).

Since the short preamble can be used for estimating and compensating the frequency offset, pattern detection of the long preamble is possible regardless of the frequency offset.

Figure 5:
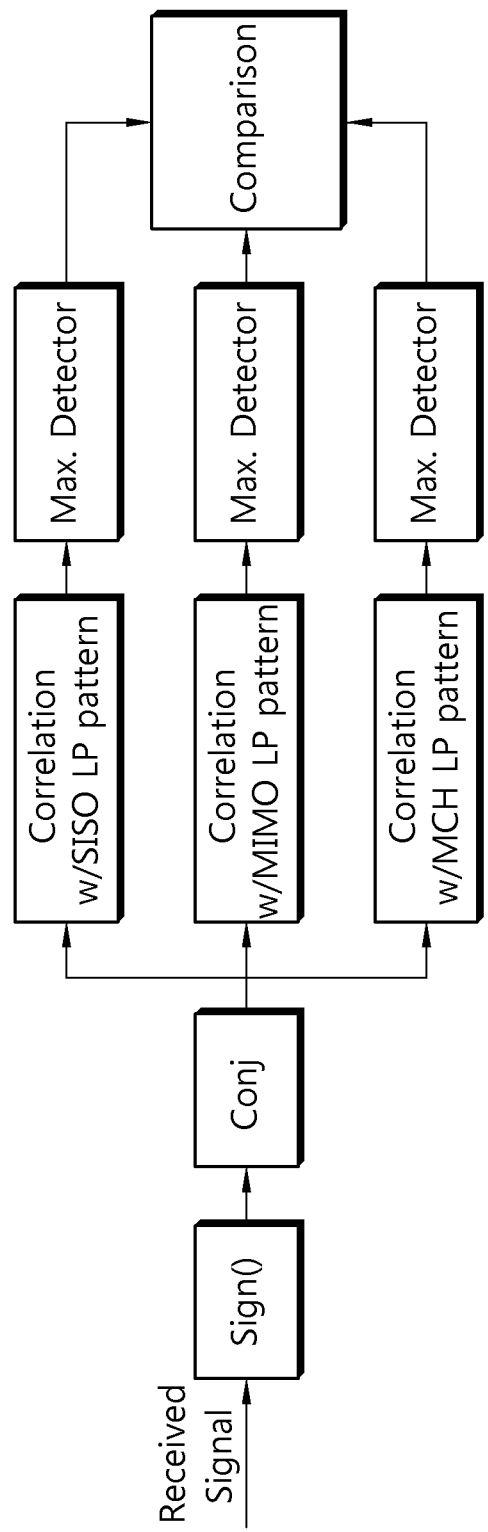
FIGS. 5 and 6 show a transmission mode detecting method according to an exemplary embodiment of the present invention.
Figure 6:
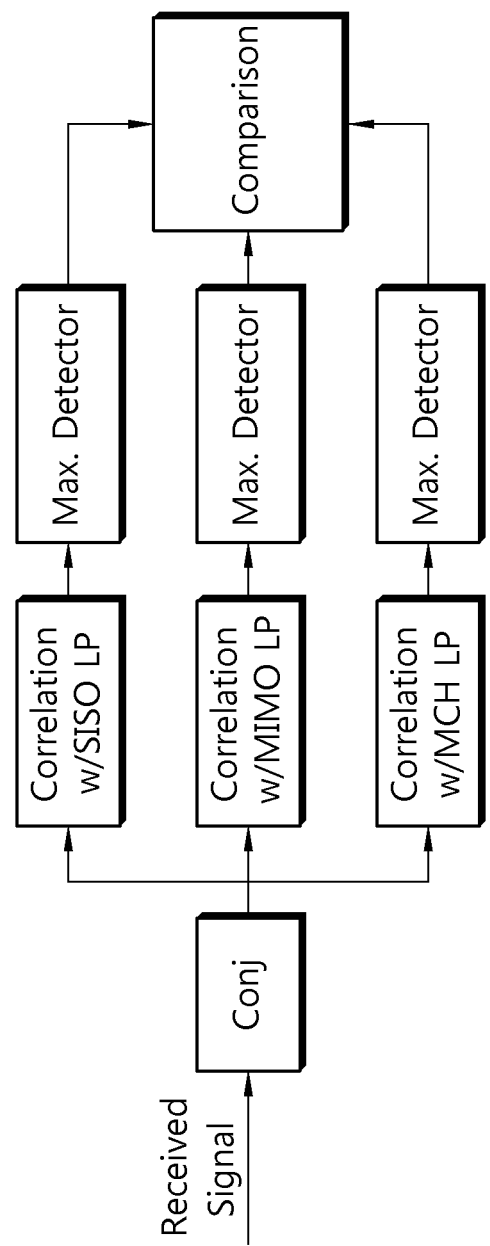

FIGS. 5 and 6 show a method for detecting a transmission mode according to an exemplary embodiment of the present invention. FIG. 5 shows a detection scheme using a correlation between a pattern of a receiving signal and a pattern of a reference signal in order to reduce complexity in materialization. FIG. 6 shows a scheme using a correlation between a receiving signal of a real time domain and the reference signal. In FIG. 5, "Sign( )" denotes a function for quantizing the receiving signal. For example, it means a function where the receiving signal is set to 1 if the strength of the receiving signal exceeds a certain level and the receiving signal is set to −1 if the strength of the receiving signal is equal to or less than the certain level. "Conj." denotes a conjugate of the receiving signal.

Referring to FIGS. 5 and 6, the receiver receives a receiving signal (more specifically, the long preamble in the PPDU). Suppose that an SISO long preamble (LP) indicates the SISO mode, an MIMO LP indicates the MIMO mode, and an MCH LP indicates the MCH mode. The receiver respectively correlates each of the SISO LP, the MIMO LP, and the MCH LP with the receiving signal, thereby obtaining respective maximum values. The receiver compares the maximum values to determine the transmission mode. In the case of FIG. 5, the receiving signal is transformed into a quantized signal, the correlation result is obtained using the SISO LP pattern, the MIMO LP pattern, and the MCH LP pattern.

Figure 7:
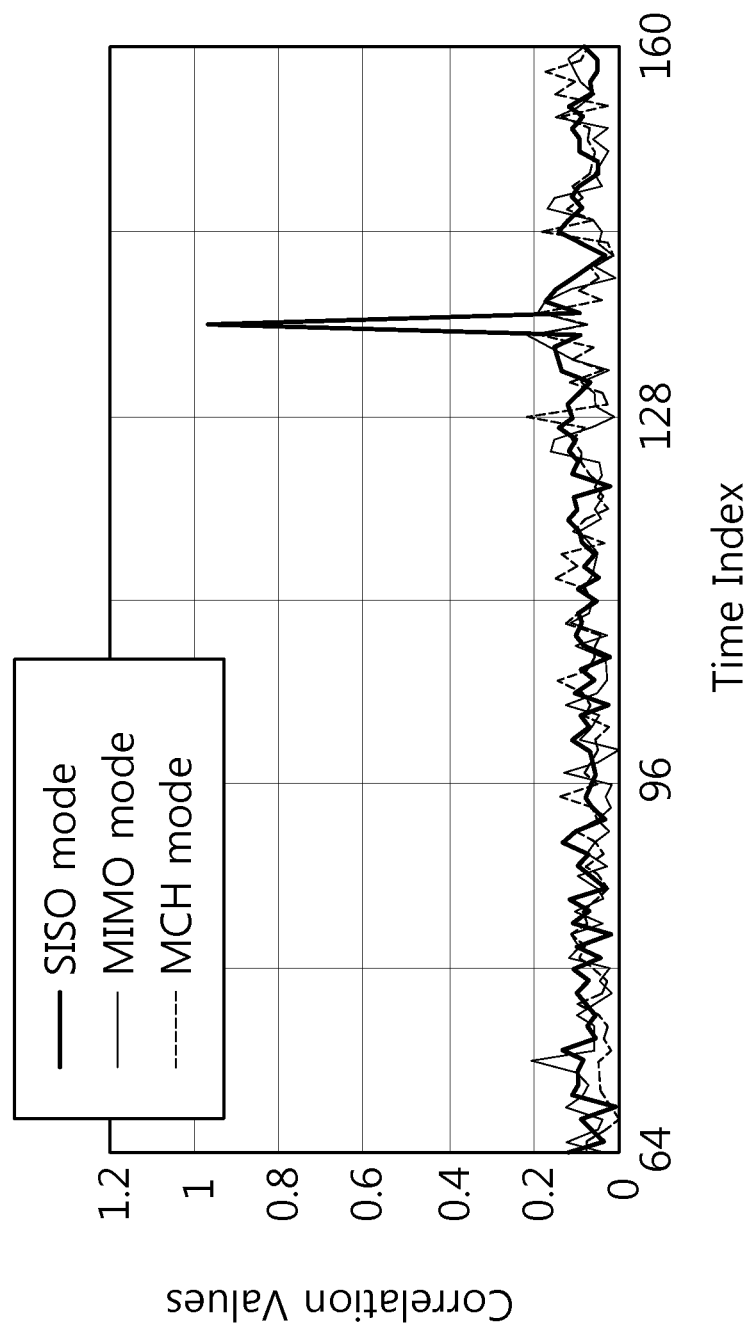
FIG. 7 is a graph showing an example of detecting a transmission mode.

FIG. 7 is a graph showing an example of detecting a transmission mode. During an observation period, the correlation between the receiving signal and each of the SISO LP, the MIMO LP and the MCH LP is obtained. In FIG. 7, the correlation between the SISO LP and the received long preamble is the highest, so that it can be ascertained that the receiver uses the SISO mode as the transmission mode.

Figure 8:
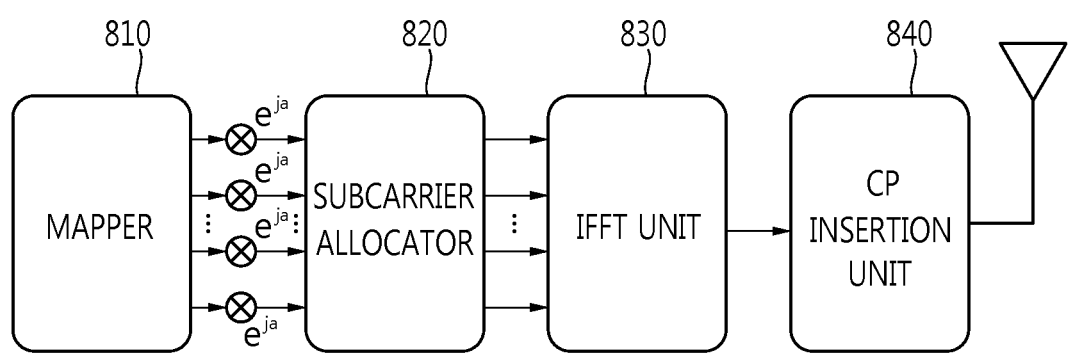
FIG. 8 is a block diagram showing a part of a transmitter that generates a preamble sequence.

FIG. 8 is a block diagram showing a part of a transmitter that generates a preamble sequence.

A mapper 810 generates complex-value symbols by mapping bits with constellation points on a signal constellation. The preamble sequence includes a plurality of complex-value symbols.

According to the transmission modes, a phase of the preamble sequence is shifted as much as a different phase offset in the frequency domain. For example, the phase of the preamble is shifted as much as $e^{j0}$ in the SISO mode, $e^{j2\pi/3}$ in the MIMO mode, and $e^{j4\pi/3}$ in the MCH mode.

A subcarrier allocator 820 allocates the phase-shifted preamble sequence to a pilot subcarrier.

An IFFF unit 830 performs IFFT and transforms the preamble sequence of the frequency domain into the preamble sequence of the time domain.

The CP insertion unit 840 inserts the CP.

In accordance with the transmission modes, the phase is shifted from a basic preamble sequence as much as the phase offset. The receiver obtains only a correlation between one preamble sequence and the receiving signal without taking the correlations of the respective transmission modes, and determines the transmission mode on the basis of phase information of the receiving signal.

Figure 9:
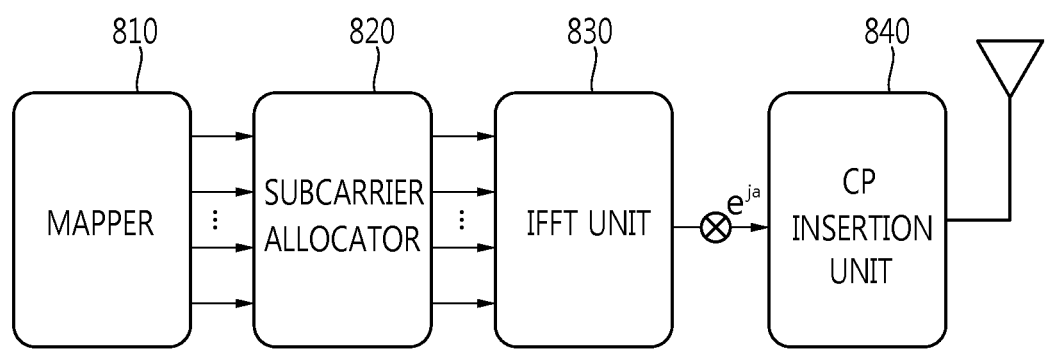
FIG. 9 is a block diagram showing a part of a transmitter that generates a preamble sequence.

FIG. 9 is a block diagram showing a part of a transmitter that generates a preamble sequence. As compared with the embodiment of FIG. 8, the phase shift is not performed in the frequency domain, but the phase of the preamble sequence is shifted in the time domain after undergoing IFFT. The phase shift may be possible not before inserting the CP but after inserting the CP.

Figure 10:
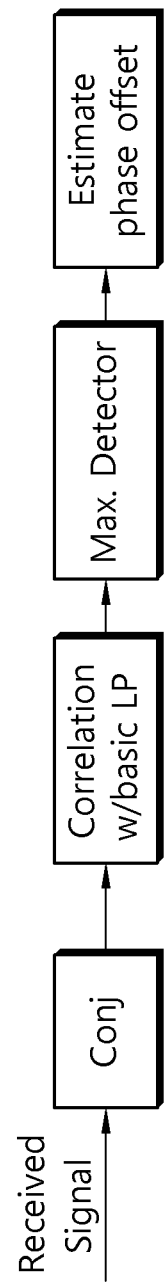
FIG. 10 is a block diagram showing detection of a transmission mode using a phase offset.

FIG. 10 is a block diagram showing detection of a transmission mode using a phase offset.

The receiver obtains a correlation between the receiving signal and a basic LP having no phase offset, thereby obtaining the maximum value. Further, the receiver estimates the phase offset by using a complex value of the correlation at a position where the maximum value is generated.

The receiver may determine the transmission mode based on the phase offset. For example, the SISO mode is determined if the detected phase offset is $e^{j0}$, the MIMO mode is determined if the detected phase offset is $e^{j2\pi/3}$, and the MCH mode is determined if the detected phase offset is $e^{j4\pi/3}$.

Figure 11:
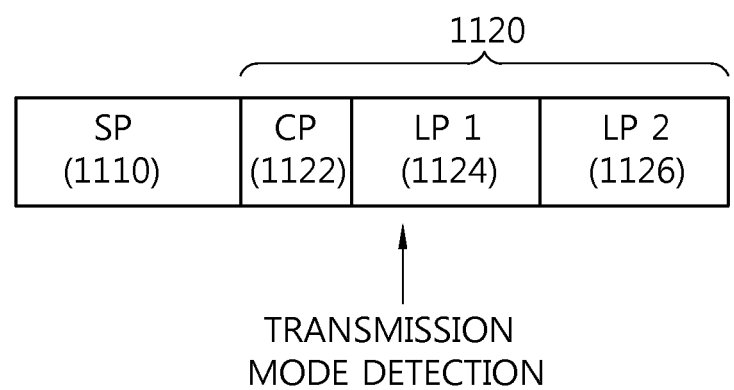
FIG. 11 shows a preamble format according to an exemplary embodiment of the present invention.

FIG. 11 shows a preamble format according to an exemplary embodiment of the present invention.

The preamble includes a short preamble (SP) 1110 and a long preamble 1120.

The short preamble 1110 has a length of 1 OFDM symbol, and is used for the initial burst detection. The initial burst detection includes the AGC tuning, the coarse frequency offset estimation and the timing synchronization.

The long preamble 1220 has a length of 2 OFDM symbols, and includes a CP 1122, a first preamble sequence (LP1) 1124, and a second preamble sequence (LP2) 1126. The first preamble sequence 1124 is used for time synchronization and/or transmission mode detection, and the phase offset based on the transmission mode may be applied. The second preamble sequence is used for channel estimation and fine frequency offset estimation.

Figure 12:
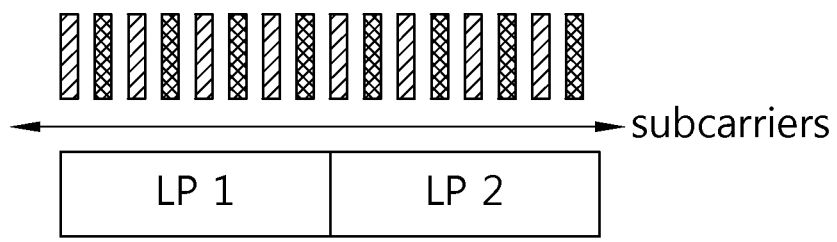
FIG. 12 shows subcarrier allocation for a long preamble in ECMA-392 standard.

FIG. 12 shows subcarrier allocation for a long preamble in ECMA-392 standard.

In ECMA-392 standard, the long preamble includes a first preamble sequence LP1 transmitted in a first OFDM symbol, and a second preamble sequence LP2 transmitted in a second OFDM symbol. The second preamble sequence LP2 is a copy of the first preamble sequence LP1.

A position of subcarriers to which the long preamble for the first antenna is allocated is alternated with a position of subcarriers to which the long preamble for the second antenna is allocated. If the long preamble for the first antenna is allocated to the subcarriers having odd indexes, the long preamble for the second antenna is allocated to the subcarriers having even indexes.

The receiver performs the channel estimation of each path in accordance with the subcarriers for the respective antennas, and uses interpolation with regard to the subcarriers for other antennas. If frequency selective fading is heavy, an error in the channel estimation may increase.

Figure 13:
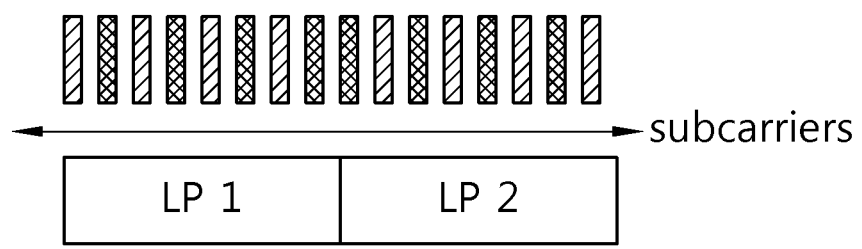
FIG. 13 shows subcarrier allocation for a long preamble according to an exemplary embodiment of the present invention.

FIG. 13 shows subcarrier allocation for a long preamble according to an exemplary embodiment of the present invention.

The position of subcarriers used in the long preamble for the respective antennas is varied in the second OFDM symbol. If the long preamble for the first antenna is allocated to the subcarriers having odd indexes (or even indexes) in the first OFDM symbol, it is allocated to the subcarriers having even indexes (or odd indexes) in the second OFDM symbol.

The receiver can estimate the channel over the entire subcarriers by collecting the subcarriers of different positions in the second OFDM symbol.

Figure 14:
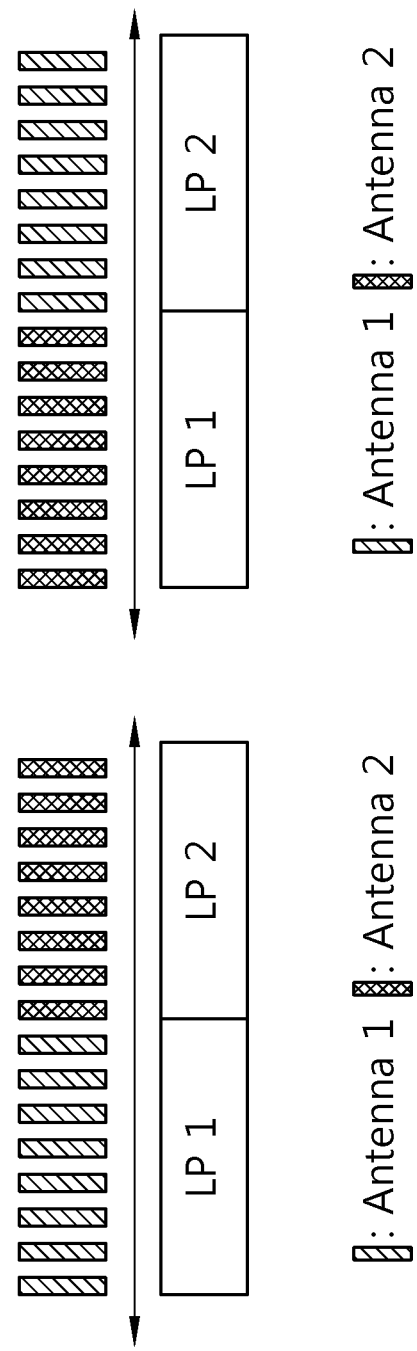
FIG. 14 shows subcarrier allocation for a long preamble according to another exemplary embodiment of the present invention.

FIG. 14 shows subcarrier allocation for a long preamble according to another exemplary embodiment of the present invention. The long preamble is transmitted for one antenna in each OFDM symbol.

Figure 15:
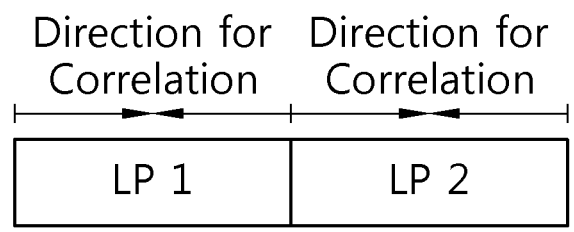
FIG. 15 shows an example of frequency offset estimation in a long preamble structure of FIG. 14.

FIG. 15 shows an example of frequency offset estimation in a long preamble structure of FIG. 14.

Samples equally distant from the center within one OFDM symbol interval (i.e., FFT size) are multiplied, and then the offset is estimated. The sum of multiplied samples of the first preamble sequence LP1 and the sum of multiplied samples of the second preamble sequence LP2 are added up together, thereby estimating the frequency offset. This can be represented by the following:

$$Freq_{est} = \frac{1}{2\pi N}\arctan\left[\sum_{n=0}^{N/2-1} x_n \cdot x_{N-n}\right] \qquad \text{[Equation 5]}$$

where, N is the FFT size.

Alternatively, there may be a transmission method of determining the subcarriers used according to antennas and then adjusting the constellation and the sequence allocated to each subcarrier.

Figure 16:
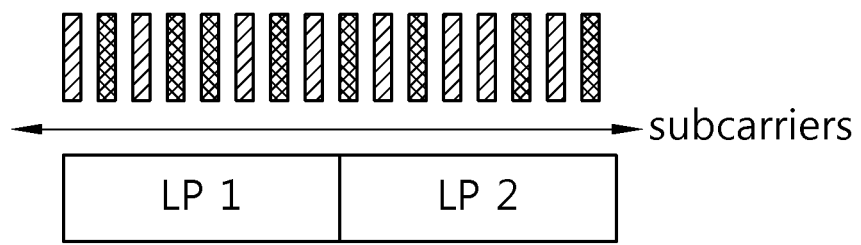
FIG. 16 shows subcarrier allocation for a long preamble according to still another exemplary embodiment of the present invention.

FIG. 16 shows subcarrier allocation for a long preamble according to still another exemplary embodiment of the present invention.

The position patterns of the subcarriers used in the long preamble for each antenna are different with respect to each OFDM symbol. If the long preamble for the first antenna is allocated to the subcarriers depending on the first pattern in the first OFDM symbol, it is allocated to the subcarriers depending on the second pattern in the second OFDM symbol. Here, the positions of the first and second antennas in the first pattern are exchanged with each other in the second pattern.

The preamble can be generated as follows.

First, the entire subcarriers are grouped into a subcarrier set having an odd index (first subcarrier set) and a subcarrier set having an even index (second subcarrier set). For instance, the first subcarrier set is a set of subcarriers having the indexes $\{-1, +1, -3, +3, \ldots\}$, and the second subcarrier set is a set of subcarriers having the indexes $\{-2, +2, -4, +4, \ldots\}$.

Then, the same symbol is allocated to the subcarriers having the index of the same absolute value, but two sets have opposite signs to each other. Let the first subcarrier set be selected to have the opposite value. Then, a symbol M1 is allocated to a subcarrier having an index of +1 that belongs to the first subcarrier set, but a symbol −M1 is allocated to a subcarrier having an index of −1, or vice versa. The same symbol M2 is allocated to the subcarriers having the indexes −2 and +2 that belongs to the second subcarrier set.

Further, one of the two sets may be modulated with a different constellation. For example, if binary phase shift keying is considered, the first subcarrier set is modulated in a real axis (or an inphase axis) and the second subcarrier set is modulated in an imaginary axis (or a quadrature axis).

When different subcarriers are allocated according to antennas in the first and second OFDM symbols, the frequency offset estimation in each OFDM symbol can be represented by the following:

$$Freq_{est} = \frac{1}{4\pi} \arctan\left[\sum_{n=0}^{N/2-1} \{(x(n) \cdot [j \cdot x(n+N/2)])^* \cdot x(n+1) \cdot [j \cdot x(n+1+N/2)]\}\right] \quad \text{[Equation 6]}$$

where, N is the FFT size.

In the foregoing exemplary embodiment, the technical concept of the present invention is applied to the preamble, but it is exemplary purpose only. The preamble is a signal known to both the transmitter and the receiver, which can be differently called a reference signal, a pilot sounding signal, a midamble, or the like.

The OFDM symbol is for just representing a symbol period in the time domain, and there is no limit to multiple access schemes or terms.

Figure 17:
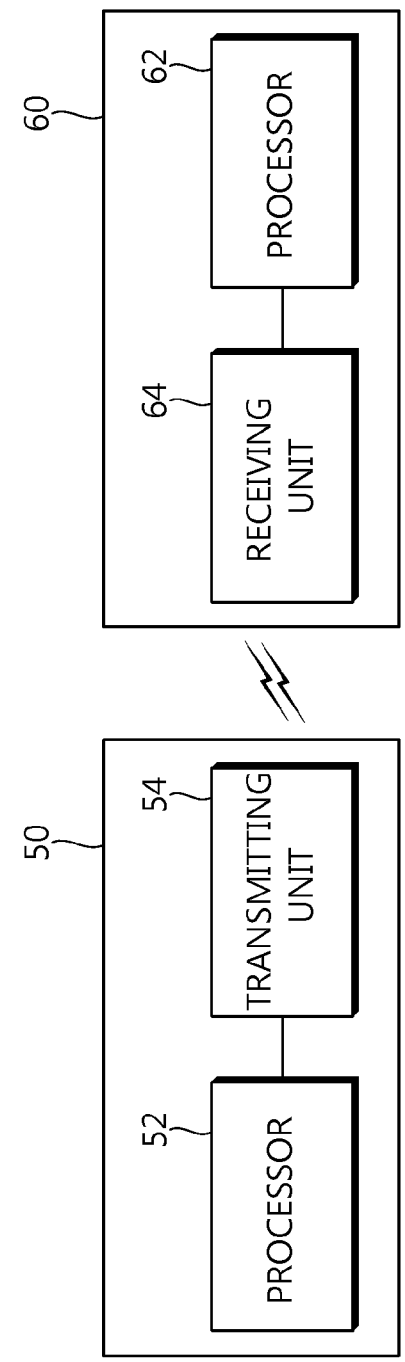
FIG. 17 is a block diagram showing a wireless communication system that realizes the exemplary embodiments of the present invention.

FIG. 17 is a block diagram showing a wireless communication system that implements embodiments of the present invention.

A transmitter 50 includes a processor 52 and a transmitting unit 54. The processor 52 generates the PPDU in accordance with the foregoing exemplary embodiments, and the transmitting unit 54 transmits the PPDU through a wireless channel. The transmitter according to the exemplary embodiments of FIGS. 8 and 9 may be implemented by the processor 52. The PPDU includes a preamble sequence for determining the transmission mode. The processor 52 generates the preamble sequence in accordance with the transmission mode.

A receiver 60 includes a processor 62 and a receiving unit 64. The processor 62 can implement the transmission mode detecting method of FIG. 4, and detect the transmission mode in accordance with the embodiments of FIGS. 5, 6 and 10. The receiver 64 receives the PPDU (or preamble sequence) through a wireless channel. The processor 62 detects the phase offset of the preamble sequence, and determines the transmission mode used by the transmitter 50 in accordance with the phase offset of the preamble sequence.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in the memory and executed by the processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A receiver comprising:
a receiving unit configured to receive a short preamble sequence and a long preamble sequence from a transmitter through a wireless channel; and
a processor configured to:
detect a frequency offset based on the short preamble sequence; and
determine a transmission mode used by the transmitter based on the long preamble sequence by:
correlating each of a single-input single-output (SISO) mode long preamble (SISO LP), a multiple-input multiple-output (MIMO) mode long preamble (MIMO LP), and a multi-channel transmission (MCH) mode long preamble (MCH LP) with the long preamble sequence to obtain respective correlated signals for the SISO transmission mode, the MIMO transmission mode; and the MCH transmission mode;
obtaining respective maximum values of the correlated signals;
comparing the maximum values with each other; and
determining the transmission mode based on a result of the comparing;
wherein the long preamble sequence comprises a first preamble sequence and a second preamble sequence; and
the processor is further configured to estimate the frequency offset by adding a sum of multiplied samples of the first preamble sequence to a sum of multiplied samples of the second preamble sequence.

2. The receiver of claim 1, wherein a phase of the long preamble sequence is shifted by a phase offset that is different for each of the SISO transmission mode, the MIMO transmission mode, and the MCH transmission mode.

3. The receiver of claim 2, wherein the short preamble sequence is transmitted by the transmitter in one orthogonal frequency division multiplexing (OFDM) symbol; and the long preamble sequence is transmitted by the transmitter in a plurality of OFDM symbols subsequent to the OFDM symbol in which the short preamble sequence is transmitted.

4. The receiver of claim 2, wherein the phase of the long preamble sequence is shifted in a frequency domain or a time domain.

5. A method of detecting a transmission mode in a wireless communication system, the method comprising:
   receiving a short preamble sequence and a long preamble sequence from a transmitter through a wireless channel;
   detecting a frequency offset based on the short preamble sequence; and
   determining a transmission mode used by the transmitter based on the long preamble sequence by:
      correlating each of a single-input single-output (SISO) mode long preamble (SISO LP), a multiple-input multiple-output (MIMO) mode long preamble (MIMO LP), and a multi-channel transmission (MCH) mode long preamble (MCH LP) with the long preamble sequence to obtain respective correlated signals for the SISO transmission mode, the MIMO transmission mode; and the MCH transmission mode;
      obtaining respective maximum values of the correlated signals;
      comparing the maximum values with each other; and
      determining the transmission mode based on a result of the comparing;
   wherein the long preamble sequence comprises a first preamble sequence and a second preamble sequence; and
   the detecting of the frequency offset comprises estimating the frequency offset by adding a sum of multiplied samples of the first preamble sequence to a sum of multiplied samples of the second preamble sequence.

6. The method of claim 5, wherein a phase of the long preamble sequence is shifted by a phase offset that is different for each of the SISO transmission mode, the MIMO transmission mode, and the MCH transmission mode.

7. The method of claim 6, wherein the short preamble sequence is transmitted by the transmitter in one orthogonal frequency division multiplexing (OFDM) symbol; and
   the long preamble sequence is transmitted by the transmitter in a plurality of OFDM symbols subsequent to the OFDM symbol in which the short preamble sequence is transmitted.

* * * * *